May 9, 1967

NOBUTOSHI KIHARA 3,318,998

PHASE STABLE SERVO SYSTEM FOR MAGNETIC TAPE RECORDING AND REPRODUCING DEVICE

Filed March 6, 1964

2 Sheets-Sheet 1

United States Patent Office 3,318,998
Patented May 9, 1967

3,318,998

PHASE STABLE SERVO SYSTEM FOR MAGNETIC TAPE RECORDING AND REPRODUCING DEVICE

Nobutoshi Kihara, Tokyo, Japan, assignor to Sony Corporation, Shinagawa-ku, Tokyo, Japan, a corporation of Japan Filed Mar. 6, 1964, Ser. No. 349,998
Claims priority, application Japan, Mar. 8, 1963, 38/12,101
5 Claims. (Cl. 178—6.6)

This invention relates to a servo system for a magnetic tape recorder, more particularly to a servo system suitable for use in a magnetic video tape recording and reproducing device (VTR).

One object of this invention is to provide a simple servo system for the driving motor for a rotary magnetic head.

Another object of this invention is to provide a simple servo system for the driving motor for a capstan.

A further object of this invention is to provide a servo mechanism including a mechanical phase comparator.

Yet a further object of this invention is to provide a servo mechanism entirely free from hunting.

Another object of this invention is to provide a servo system which does not require the usual pulse generator.

Figure 1:
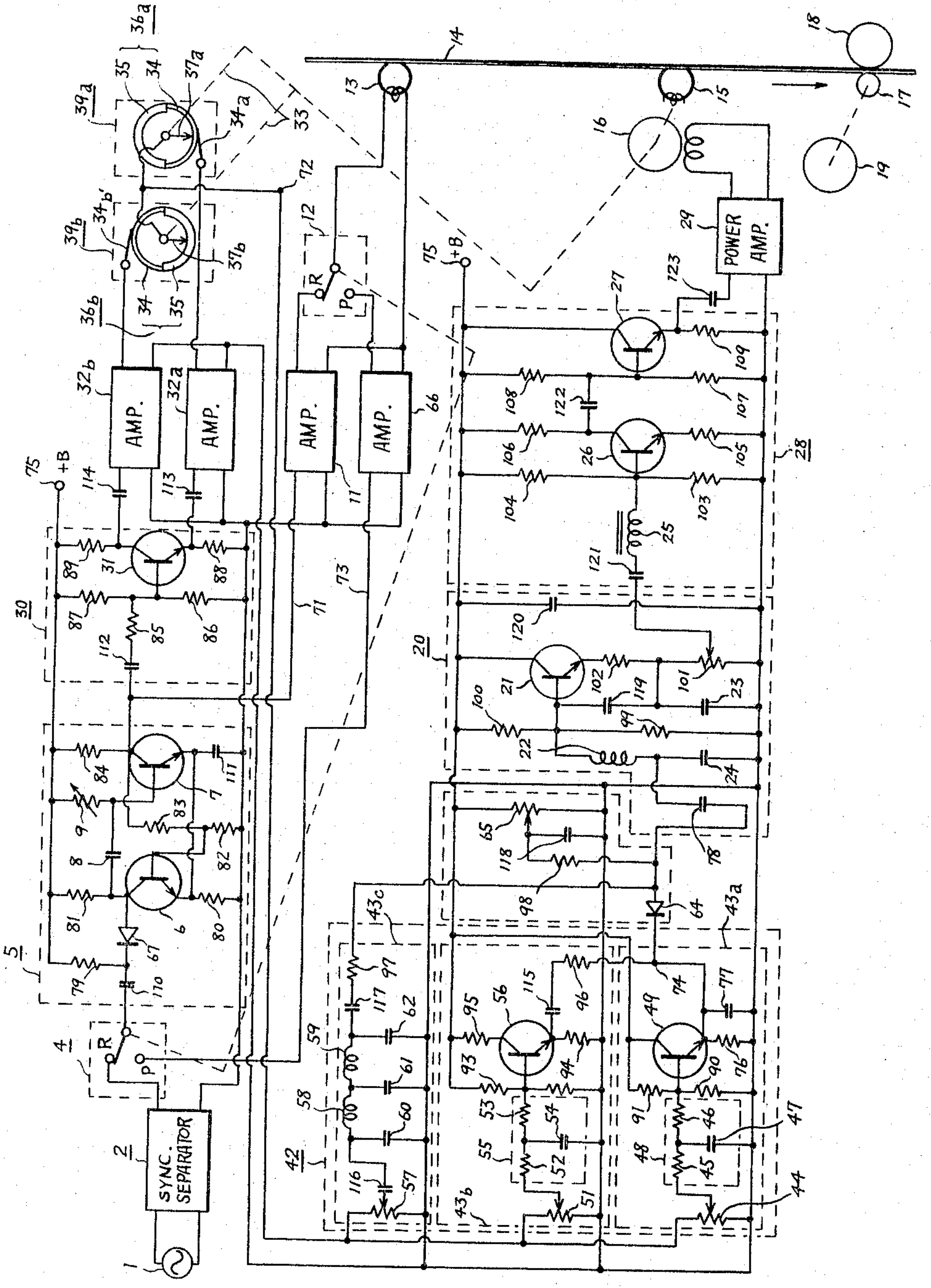
Figure 2:
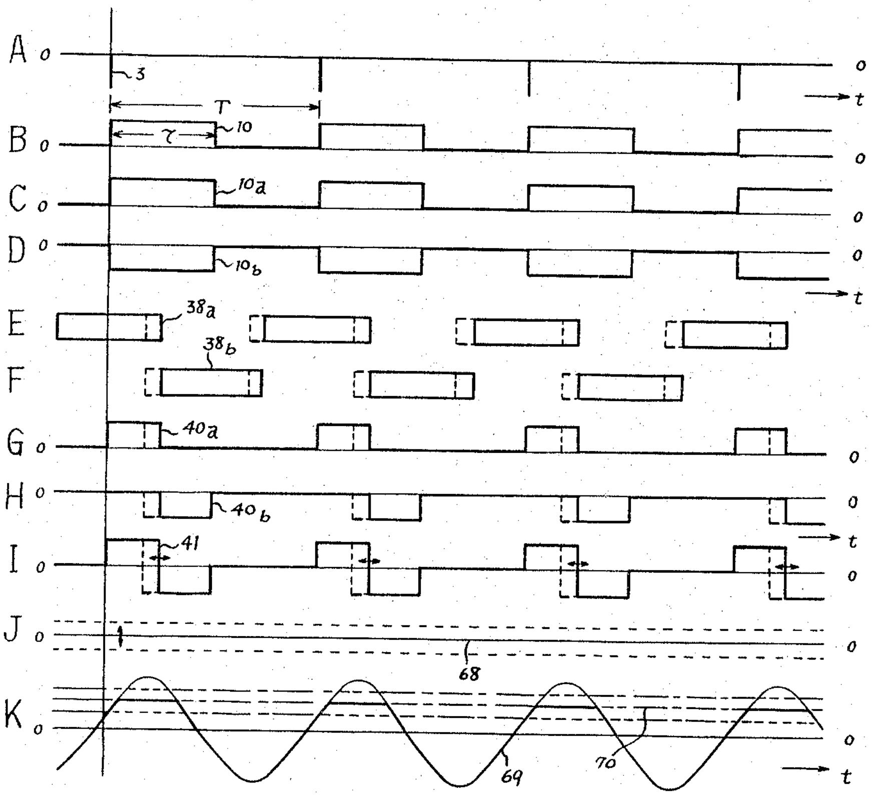
Figure 3:
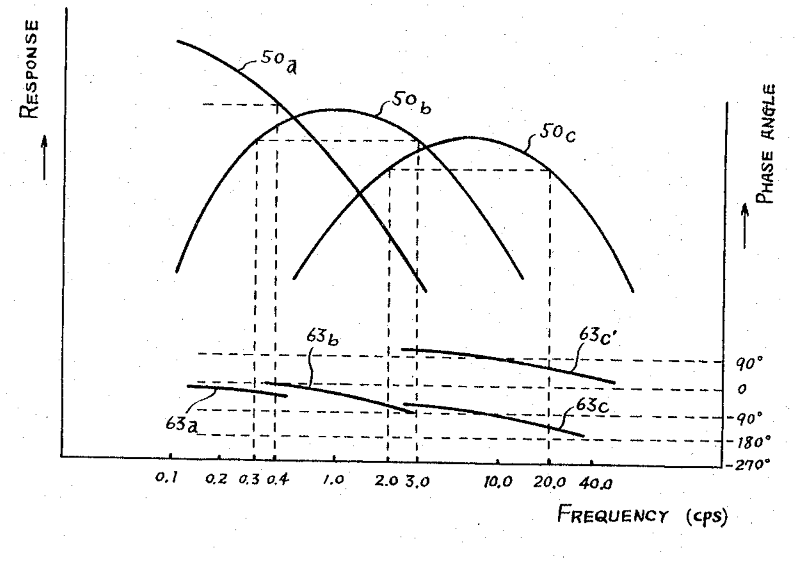

Additional objects and features of the invention will appear from the following description in which the preferred embodiment has been set forth in detail in conjunction with the accompanying drawings, in which:

FIGURE 1 is a circuit diagram illustrating an example of a servo system for a driving motor of a magnetic tape recording and reproducing device according to this invention;

FIGURES 2–A to 2–K, inclusive, show the signal wave forms occurring at various parts of the circuit and their time relationship; and FIGURE 3 is a graph illustrating frequency characteristics of an integration device usable in this invention.

Referring now to the drawing, 1 is a conventional source of video signal, from which composite video signals including vertical and horizontal synchronizing signals are available. The composite video signal from the source 1 is supplied to a well-known synchronizing signal separator 2, at the output end of which is obtained a vertical synchronizing signal pulse 3 such as shown in FIGURE 2–A. This vertical synchronizing signal pulse 3 is referred to as a control signal in this specification, having a frequency equal to 60 c.p.s. and supplied through a switching device 4 to, for example, a monostable multivibrator 5. This monostable multivibrator 5 may be formed in various known ways, but in the present embodiment it includes transistors 6 and 7 and is triggered by the vertical synchronizing signal pulse 3 to form a rectangular wave 10 having a width determined by the time constant of the coupling capacitor 8 of the two transistors 6 and 7, and a resistor 9 connected to one end of the capacitor 8. The time constant is established in such a manner that there is obtained the usual rectangular wave signal 10 having a duty factor equal to ½ as illustrated in FIGURE 2–B. The period of the rectangular wave signal 10 is designated T.

The rectangular wave signal 10 from the monostable multivibrator 5 is applied through a connection 71 to an amplifier 11 which is preferably transistorized, and it is thence further supplied to a control track head 13 through a switching device 12 which may be operatively associated or "ganged" with the switching device 4 as shown by the broken line. The control head 13 confronts, for example, the marginal edge portion of a magnetic tape 14 traveling at a constant speed, where the rectangular wave signal 10 for the control signal is in the known way recorded after differentiation. In this case the switching devices 4 and 12 are, of course, held in the "recording" position R.

In a portion of the magnetic tape 14 other than the marginal edge portion for the control signal track, video signal is recorded oblique to the direction of travel of the magnetic tape. 15 designates a known rotary magnetic head therefor, and 16 a synchronous motor for driving the rotary magnetic head. The magnetic tape 14 is as usual transported by a capstan 17 and a pinch roller 18. 19 is a synchronous motor for tape driving use which is mechanically coupled to the capstan 17.

In the present invention a servo system is provided for either the synchronous motor 16 for rotary magnetic head driving or for the synchronous motor 19 for magnetic tape driving, or both, but the following description will, for clarity, be made in conjunction with an example in which the present invention is applied to the synchronous motor 16 for the magnetic head driving application. The motor 16 is driven by, for example, the amplified output from a low frequency oscillator of 60 c./s. A variable oscillator indicated by the reference numeral 20 in FIGURE 1 may be constructed in various known ways, but in the figure a Clapp type oscillator similar to a Colpitts oscillator has been shown, including a transistor 21, an oscillation coil 22 and capacitors 23 and 24 which are connected between the base of the transistor 21 and the ground, the oscillation coil and the capacitors principally determining the oscillation frequency. The oscillator 20 is provided with a tuning coil 25 for shaping the output thereof to a substantially sinusoidal form of signal, and the output is supplied to a power amplifier, namely a motor amplifier 29, through a buffer amplifier 28 formed by transistors 26 and 27, and the output therefrom drives the head motor 16.

According to the invention, if deviations occur in the speed of revolution of the motor 16, the oscillation frequency is varied so as to promptly return the rotation to its normal rate. As a result, the rotary head 15 will precisely scan and follow the magnetic tracks. Electric signal for varying the oscillation frequency is preferably obtained with a simple and accurate device described hereinbelow.

That is, the rectangular wave signal 10 derived from the monostable multivibrator 5 is supplied to a phase splitter 30. As is well-known, the phase splitter 30 can, for example, be formed by a transistor 31, which may be so connected as to obtain, from its emitter and collector, two rectangular wave signals 10*a* and 10*b* which are in opposite phase or displaced 180° apart in phase as illustrated in FIGURES 2–C and 2–D. The two rectangular wave signals 10*a* and 10*b* from the phase splitter 30 are supplied respectively to amplifiers 32*a* and 32*b*, and amplified.

On the other hand, there are provided, in association with the motor shaft 33 of motor 16, two switching means 39*a* and 39*b* which are switched on and off at the same period as that of the rectangular wave signals 10*a* and 10*b*, and in opposite relation to each other. As such switching means, mechanical switching means may be employed which consists of a commutator ring and a brush. In the figure two rings 36*a* and 36*b* having conductive portions 34 of 180° angular extent and non-conductive (insulation) portions of the remaining 180° angular extent, are staggered with an offset angle of 180° with respect to the rotary shaft 33. On the rotary shaft 33, brushes 37*a* and 37*b* are mounted at the identical angular position. The rectangular wave signals 10*a* and 10*b* from the amplifiers 32*a* and 32*b* are respectively supplied to the conductive portions 34 of the rings 36*a* and 36*b* respectively, through contactors 34*a'* and 34*b'*. The two brushes 37*a* and 37*b* are connected together and led to a common output terminal 72.

Assuming that the time when the brush 37*a* contacts the conductive portion 34, namely the time when the switching means 39*a* is turned on, corresponds to the phase position of 90° with respect to the rectangular wave signal 10*a* on-and-off-states result as illustrated by the reference numerals 38*a* and 38*b* in FIGURES 2–E and 2–F. During the one-state of the switching device 39*a* or 39*b* the rectangular wave signals 10*a* and 10*b* are led out through the brushes 37*a* and 37*b* as rectangular wave signals 40*a* and 40*b*, as shown in FIGURES 2–G and 2–H. Then the signals 40*a* and 40*b* are mixed together, with the result that the positive and negative composite step-like rectangular wave signal 41 is obtained as illustrated in FIGURE 2–I.

The rectangular wave signal 41 obtained at the common output end 72 of the switching means 39*a* and 39*b* is applied to integration circuit means 42.

The integrating circuit means include at least three integration circuits which have different time constants and are connected together in parallel. The necessity for at least two integration circuits has heretofore been stressed in magnetic video tape recording which requires high precision. That is, it is known that when only one integration circuit is used in the servo system, the motor seldom responds to disturbances of extremely high frequency content in any transient irregular rotation of the motor. Where two integration circuits are used, phase shift becomes large in the high frequency component of the circuit, and servo action is still not perfect.

In the present embodiment three integration circuits 43*a*, 43*b* and 43*c* are provided for a motor such as one rotated by power supplied at 60 c.p.s.

The first integration circuit 43*a* is formed by, for example, a T-type filter 48 consisting of resistors 45 and 46 and a capacitor 47 connected through a variable resistor 44 provided at the input side of the circuit and with a transistor amplifier 49 connected to the output of the filter, and the filtering characteristic or time constant is determined so that the circuit may respond essentially to oscillation components of less than 0.4 c.p.s., as shown by the curve 50*a* in FIGURE 3. The second integration circuit 43*b* may also be formed with a filter 55 composed of resistors 52 and 53 and a capacitor 54 with a variable input resistor 51 and with a transistor amplifier 56 connected to the output of the filter 55, and the characteristic is determined so that the circuit may respond essentially to oscillation components of from 0.2 to 3 c.p.s. as illustrated by the curve 50*b* in FIGURE 3. Further, the third integration circuit 43*c* may be formed to be of $\pi$ type with inductors 58 and 59 and capacitors 60, 61 and 62 with a variable input resistor 57, and the time constant is determined so that the circuit may respond essentially to oscillation component of more than 2 c.p.s. as shown by the curve 50*c* in FIGURE 3. Since the inductors 58 and 59 are used in place of resistors in the integration circuit 43*c*, no D.C. amplifier consisting of a transistor is required. Furthermore, relatively high frequency is dealt with in this integrator, and hence good response can be obtained. In this case the phase shift of transient rotation at the integration circuits 43*a* and 43*b* essentially lies in a range of 0° to −90° as illustrated by the curves 63*a* and 63*b* in FIGURE 3, while that at the integration circuit 43*c* lies in a range of +90° to 0° as shown by the curve 63*c'* in FIGURE 3. Therefore, where D.C. outputs are to be obtained through the integration circuits 43*a*, 43*b* and 43*c*, the phase of the integration circuit 43*c* must be adjusted to those of the other circuits 43*a* and 43*b*. If such adjustment of the phase is not affected, signal for controlling the aforementioned oscillator 20 operates to counter such control, because the phase of the D.C. component obtained from the integration circuit 43*c* would be substantially inverse to the D.C. component or error signal of the integration circuits 43*a* and 43*b*.

To avoid such trouble, an output terminal 74 of the integration circuits 43*a* is provided at the emitter of the transistor 49, which emitter is thus connected to, for example the cathode of a diode 64. The output terminal of the integration circuit 43*b* is also connected to the cathode of the diode 64 at the emitter of the transistor 56, and the output terminal of the integration circuit 43*c* is connected to the anode of the diode 64. Thus the phase of the integration circuit 43*c* is inverted and added to those of the integration circuits 43*a* and 43*b*. As a result of this, the curve 63*c* can be obtained.

To the anode of the diode 64, bias is applied through a variable resistor 65 connected to the power source 75 and the cathode is connected to ground through a low impedance circuit consisting of a resistor 76 and a capacitor 77. It will be seen that when the diode 64 becomes conductive, a capacitor 78 is effectively inserted in parallel to a capacitor 24.

During reproduction, the control track head 13 is connected through the switch 12 to an amplifier 66 and signals reproduced and amplified from the rectangular wave signals 10 recorded on the magnetic tape 14 are supplied to the monostable multivibrator 5 through the aforementioned switch 4 and a connection 73. The signals reproduced by the magnetic head 13 are alternately positive and negative differentiated pulses, so a diode 67 is connected to the input of the monostable multivibrator so as to provide only the single-polarity differentiated pulses as shown in FIGURE 2–A.

In the device described above, during recording the switching devices 4 and 12 are connected respectively to the synchronizing signal separator 2 and the amplifier 11, and the magnetic tape 14 is transported through the capstan 17 and the pinch roller 18 driven by the motor 19. At this time the rectangular wave signals 10 such as shown in FIGURE 2–B are recorded on the magnetic tape 14 by the control head 13, and the rotary magnetic head 15 is rotated by the motor driven by the output of the oscillator 20 and simultaneously records video signals on the magnetic tape 14. In this case if the rotary magnetic head 15 rotates normally, intervals during which the switching means 39*a* and 39*b* remain "on" and "off" are as illustrated by the full lines 38*a* and 38*b* in FIGURES 2–E and 2–F, as is apparent from the foregoing. On the other hand, the rectangular wave signals 10*a* and 10*b* supplied to the switching means 39*a* and 39*b* are as shown in FIGURES 2–C and 2–D.

Accordingly, composite rectangular waves such as indicated at 41 in FIGURE 2–I are produced at the output terminal 72 of the switching device. The respective areas of the positive and negative portions of one period T of the rectangular wave signal 41 are equal. Therefore, the D.C. output of the integration device 42 is zero, which is the reference condition, and the oscillator 20 continues to oscillate at a predetermined constant frequency. Where the rotation of the motor 16 is caused to be irregular by some cause, the phase positions at which the switching means 39*a* and 39*b* are turned on and off are varied with respect to the rectangular wave signals 10*a* and 10*b* as shown by the dotted lines in FIGURES 2–E and 2–F, and the phases of the rectangular wave signals 38*a* and 38*b* in FIGURES 2–G and 2–H are also varied as shown by the dotted lines, with the result that the positive and negative areas of the composite rectangular wave signal 41 are varied as illustrated by the dotted lines in FIGURE 2–I.

Consequently, the D.C. components of the integration circuit means 42 are varied to be positive or negative in response to lag or lead of the motor 16 as shown by the dotted lines in FIGURE 2–J. Thus, the diode 64 becomes conductive in response to such an error voltage D.C. signal 68, and as a result the oscillation output supplied to the diode 64 such as shown in FIGURE 2–K is shifted from the reference level 70 and clipped at the position shown by the chain lines, and accordingly the oscillation frequency of the oscillator 20 is changed in the direction needed to restore the proper shaft position. Then the output of the oscillator 20 is shaped in the buffer amplifier 28 and supplied to the motor 16, forming a closed-loop phase-sensitive servo system.

In such a case, since the integration circuit means 42 consist of three integration circuits 43*a*, 43*b* and 43*c* and a phase inverter for high frequency components, accurate servo action can be established promptly even in the higher oscillation component ranges.

During reproduction the switching devices 4 and 12 are connected respectively to the output terminal and input terminal of the amplifier 66, and pulses obtained by the magnetic head 13 become pulse signals 3 such as shown in FIGURE 2–A through the diode 67, whereby the rectangular wave signals 10 such as shown in FIGURE 2–B are obtained in the monostable multivibrator 5, and a pair of rectangular wave signals such as illustrated in FIGURES 2–C and 2–D are supplied respectively to the switching means 39*a* and 39*b* through the phase splitter 30 and the amplifiers 32*a* and 32*b*, controlling the rotation of the motor 16 as previously explained.

As is apparent from the foregoing, according to the present invention the rotating speed or the phase of a motor is detected by simple switching means thereby to control the motor immediately. Furthermore, this invention is extremely suitable for use in a magnetic video tape recorder by reason of the combination of that feature with the integration circuit means having three different time constants.

A typical and illustrative circuit in accordance with the foregoing was constructed in which the components and voltages were as follows.

Voltage: +B ---------- volts -- 24

Resistors (ohms):

| | |
|---|---|
| 9 | 50K var. |
| 44 | 5K var. |
| 45 | 1.5K |
| 46 | 1.0K |
| 51 | 10K var. |
| 52 | 10K |
| 53 | 1K |
| 57 | 50K |
| 65 | 10K var. |
| 76 | 1K |
| 79 | 47K |
| 80 | 470 |
| 81 | 2.7K |
| 82 | 18K |
| 83 | 33K |
| 84 | 2.7K |
| 85 | 18K |
| 86 | 10K |
| 87 | 180K |
| 88 | 1K |
| 89 | 1K |
| 90 | 10K |
| 91 | 100K |
| 92 | 10K |
| 93 | 100K |
| 94 | 1K |
| 95 | 10K |
| 96 | 400 |
| 97 | 33K |
| 98 | 33K |
| 99 | 56K |
| 100 | 47K |
| 101 | 10K var. |
| 102 | 56 |
| 103 | 10K |
| 104 | 100K |
| 105 | 1K |
| 106 | 10K |
| 107 | 10K |
| 108 | 15K |
| 109 | 1K |

Capacitors (microfarads):

| | |
|---|---|
| 8 | 0.3 |
| 23 | 1.0 |
| 24 | 0.1 |
| 47 | 400 |
| 54 | 20 |
| 60 | 0.5 |
| 61 | 1.0 |
| 62 | 1.0 |
| 77 | 50 |
| 78 | 0.1 |
| 110 | 0.05 |
| 111 | 50 |
| 112 | 50 |
| 113 | 100 |
| 114 | 100 |
| 115 | 200 |
| 116 | 5.0 |
| 117 | 1.0 |
| 118 | 200 |
| 119 | 2 |
| 120 | 100 |
| 121 | 0.2 |
| 122 | 10 |
| 123 | 20 |

Inductors:

| | |
|---|---|
| 22 | Type VL–210 |
| 25 | Type VL–211 |
| 58 | henrys -- 60 |
| 59 | do ---- 60 |

The foregoing disclosure has been made in conjunction with an example in which the monostable multivibrator 5 is triggered to obtain the rectangular wave signal 10, but by doubling the frequency of the trigger pulse or the period of the switching means, a bistable multivibrator may be used. Furthermore, the switching means are not limited to mechanical contact mechanism but may be constructed as an electronic switching structure such that magnetic-to-electric or optical-to-electric converting or transducer means are associated with the rotary shaft of the motor to obtain pulses corresponding to those in FIGURES 2–E and 2–F, thereby to switch on and off, for example, a transistor or a diode.

In the foregoing a servo system has been described only in connection with a rotary magnetic head drive, but it will be understood that such a servo system is equally applicable for a capstan drive.

It will be apparent that many other modifications and variations may be effected without departing from the scope of the novel concept of this invention.

What is claimed is:

1. A servo system for a magnetic tape recording and reproducing device comprising a magnetic tape, a rotary magnetic head for recording signals thereon or reproducing the signals therefrom, a motor for driving said magnetic head, a variable oscillator for energizing said motor, a control head in magnetic relation with said magnetic tape to record or reproduce control signals thereon, a phase splitter connected to receive such control signals, two switching means associated with the rotary shaft of said motor so as to be turned on and off in opposite phase to each other, means for applying the output of said phase splitter to the input side of said two switching means, an output circuit common to said two switching means, integration circuit means connected to the output circuit and having at least three different time constants, and means for varying the oscillation frequency or the phase of said variable oscillator in accordance with the output of said integration circuit means.

2. A servo system for a magnetic tape recording and reproducing device comprising a synchronizing signal separator, means for recording on a magnetic tape synchronizing signals derived from said synchronizing signal separator, means for obtaining pulse signals having a constant width referred to said synchronizing signals, a phase splitter, means for applying said pulse signals to said phase splitter to provide at its output a pair of switching pulses in opposite phase, two switching devices, said pair of switching pulses being supplied to said devices, an output connection common to said two switching devices, an oscillator, a motor controlled by said oscillator, integration circuit means inserted between said output connection and said oscillator, and means for coupling said motor and said switching devices.

3. A servo system for a magnetic tape recording and reproducing device comprising a synchronous motor normally rotating at a desired speed corresponding to a supply frequency, a variable oscillator for driving said motor, at least three integration circuits connected together in parallel and each having a different frequency response characteristic for respective frequency ranges lower than said supply frequency, means for mixing the output of that one of said integration circuits having the highest-range frequency response characteristic with the outputs of the other two integration circuits in the reverse phase relation, means for applying said mixed output to said variable oscillator, means for applying rectangular wave signals jointly to said integration circuits, and means for varying the width of said rectangular wave signals in response to variations in the speed of rotation of said motor.

4. A servo system for a magnetic tape recording and reproducing apparatus of the type including a magnetic tape, a magnetic information-transducing head, and electric motor drive means for imparting desired syschronous movement of said tape and said head relative to one another, said drive means being responsive to the frequency of its power supply to control its driving speed; a variable oscillator for energizing said motor, a control head in magnetic relation with said tape to record thereon, or selectively to reproduce therefrom, control signals bearing a definite timed relation to information signals to be recorded on, or reproduced from, said tape, a phase splitter connected to receive such control signals, two switching means associated with the rotary shaft of said motor so as to be turned on and off in opposite phase to each other, means for applying the outputs of said phase splitter to the respective input sides of said two switching means, an output circuit common to said two switching means, integration circuit means connected to the output circuit and having at least three different time constants, and means for varying the oscillation frequency or the phase of said variable oscillator in accordance with the output of said integration circuit means.

5. A servo system for a magnetic tape recording and reproducing apparatus comprising a synchronizing signal separator, means for recording on a magnetic tape synchronizing signals derived from said separator, means for obtaining, from the recorded synchronizing signals, pulse signals having a constant width referred to said synchronizing signals, a phase splitter, means for applying said pulse signals to said phase splitter to provide at its output a pair of switching pulses for each of said pulse signals but in opposite phase, two switching devices, the pulses of each of said pair of switching pulses being supplied respectively to said devices, an output connection common to said devices, an oscillator, a motor controlled by said oscillator, integration circuit means inserted between said output connection and said oscillator, and means for coupling said motor and said switching devices.

References Cited by the Examiner

UNITED STATES PATENTS

| | | | |
|---|---|---|---|
| 3,175,034 | 3/1965 | Kihara | 178—6.6 |
| 3,277,236 | 10/1966 | Machein | 178—6.6 |

DAVID G. REDINBAUGH, *Primary Examiner.*

H. W. BRITTON, *Assistant Examiner.*